Dec. 27, 1927.
W. R. ECKE ET AL
1,653,802
EMBOSSING DIE
Filed March 11, 1927
2 Sheets-Sheet 1
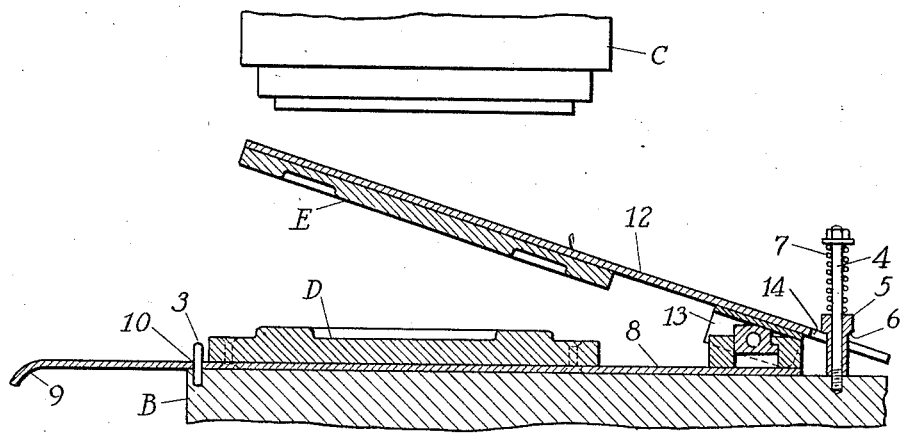
Fig. I.
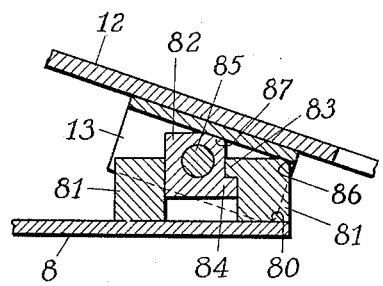
Fig. II.
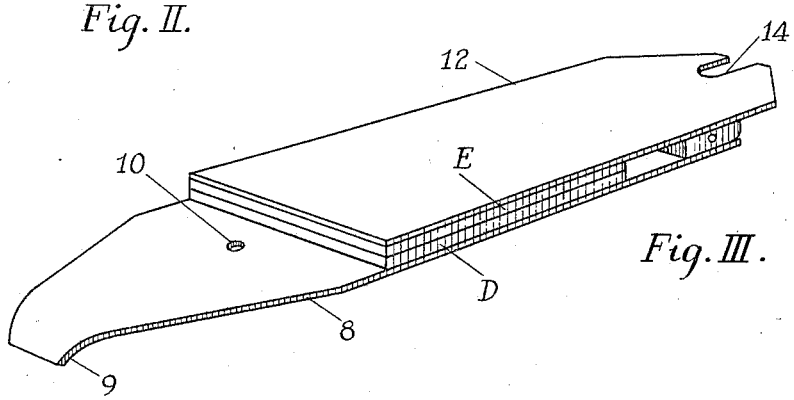
Fig. III.
INVENTORS
William R. Ecke
James H. Matthews
by Christy and Christy
their Attorneys Dec. 27, 1927.
W. R. ECKE ET AL
1,653,802
EMBOSSING DIE
Filed March 11, 1927
2 Sheets-Sheet 2
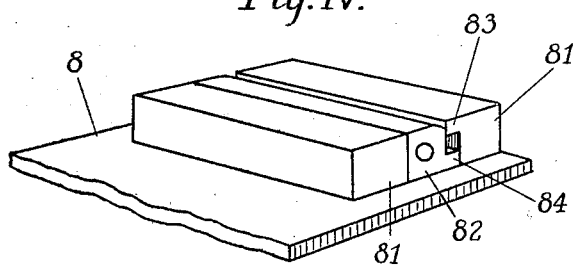
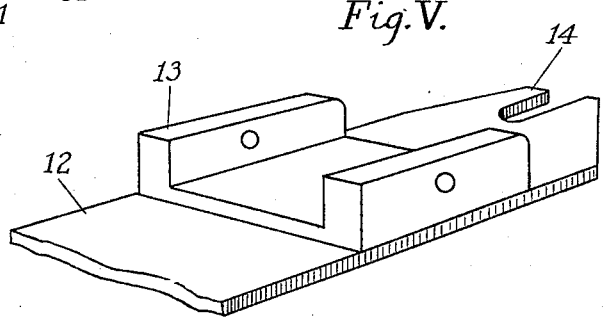
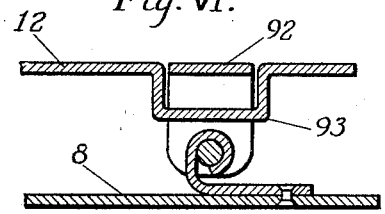
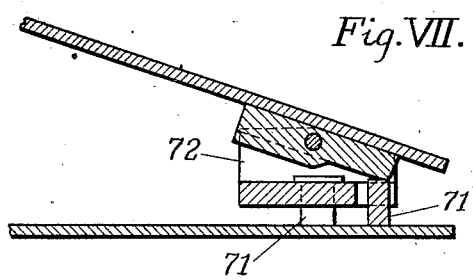
INVENTORS
William R. Ecke
James H. Matthews
By Christy and Christy
their attorneys Patented Dec. 27, 1927.

1,653,802

UNITED STATES PATENT OFFICE.

WILLIAM R. ECKE AND JAMES H. MATTHEWS, OF PITTSBURGH, PENNSYLVANIA, ASSIGNORS TO JAS. H. MATTHEWS & COMPANY, OF PITTSBURGH, PENNSYLVANIA, A CORPORATION OF PENNSYLVANIA.

EMBOSSING DIE.

Application filed March 11, 1927. Serial No. 174,607.

Our invention relates to improvements in embossing dies, and we have made the invention as a specific improvement upon the embossing dies shown and described in Letters Patent of the United States, Re. 15,279, granted on the application of James H. Matthews, one of the present applicants. The object in view is a refinement in structure and consequently in operation, whereby the embossing of a character in sheet metal may be more satisfactorily performed.

The die of our invention is illustrated in the accompanying drawings. Fig. I is a view in longitudinal section of the die of our invention in place in the embossing press. Fig. II is a fragmentary view to larger scale, on the same plane of section. Fig. III is a view in perspective of the die dismounted from the press. Figs. IV and V are views in perspective of the parts of the die structure, separated one from another (the pivot pin being removed), and one part (that shown in Fig. V) in inverted position. Figs. VI and VII are views corresponding to Fig. II and illustrating modifications.

In Fig. I the bed plate of an embossing press is indicated at B, and the ram at C. The die is removably placed on bed plate B and beneath the ram C, where responsive to the stroke of the ram it is powerfully closed upon an introduced sheet of material, ordinarily sheet metal, to emboss upon it the character desired. It is desirable that the relative movement of the die members during the actual embossing operation, be a right-line movement, as distinguished from a pivotal movement, and it is also desirable that the outer faces of the assembled die be plane surfaces, to allow for easy insertion and removal to and from the die press. These desirable features are combined in the die of our invention.

The die includes a nether die plate 8, which immediately engages the bed plate B of the press and is immovably borne upon the bed plate B during the embossing operation, and an upper die plate 12, united to but movable relatively to the nether plate, and, when the die is in place, adapted to be powerfully driven by ram C toward the nether plate 8. Upon the upper face of the nether die plate 8 and the nether face of the upper die plate 12 the two complementary bodies D and E are borne. The nether die plate toward its outer end (the left-hand end, Fig. I) is provided with an orifice 10, adapted to engage a stationary pin 3 standing at the outer edge of the bed plate B. The upper die plate at its inner end (the right-hand end, Fig. I) is provided with a notch 14, adapted to engage a collar 5 which is movable upon a pin 4 standing toward the rear of bed plate B and in alignment with pin 3. The collar 5 is provided with a downward extension of reduced diameter, and by this provision a shoulder 6 is formed upon the collar, and this shoulder is maintained elevated at an interval above the bed plate B of the press. The pin 4 is provided with an enlarged head and beneath this head and between it and collar 5 a coiled spring 7 is placed whose tension is effective downwardly upon collar 5. The outer end of the nether die plate 8 is shaped to a handle 9. By such provision the die, being removable, may be accurately seated in the press.

The nether die plate 8 toward its inner end is provided with two transversely and upwardly extending blocks 81 which constitute a guideway for a vertically movable block 82. One or both of the blocks 81 are provided with an overhanging rim 83 and block 82 is provided with a corresponding lateral flange (or, it might be, flanges) 84, by means of which block 82 is confined to a limited range of vertical reciprocation between blocks 81. The upper die plate 12 toward its inner end is provided with a pair of downward extending lugs 13 in transverse alignment, and properly spaced, so that in the assembly these lugs 13 overlap the end of blocks 81 and of the block 82, in place between blocks 81. Thus the block 82 is inclosed on every side, but has the capacity to move vertically with respect to die plate 8 through a limited range of reciprocation. Pivot-holes are formed through block 82 and through the lugs 13, and a pivot-pin 85 extending through the aligned pivot-holes articulates the parts into a complete die. The parts are so proportioned that when in the operation of ram C block 82 moves downward and the die closes, the die plate 12 is freely responsive to the downward thrust of the ram.

Fig. III shows the die in collapsed and dismounted condition. When the die is to be applied to the press the attendant picks it up by handle 9 and thrusts it inward, from left to right Fig. I. In so thrusting it in the attendant holds the die in downwardly inclined position and, by virtue of the fact that the notched rear end of die plate 12 overhangs the rear end of die plate 8, and of the further fact that by virtue of a prolongation of reduced diameter the shoulder 6 of collar 5 stands elevated above bed plate B, it is possible so to bring the notched end 14 of plate 12 beneath the shoulder 6 of collar 5. When this has been done the attendant swings the outer end of the die plate 8 downward, and causes the perforation 10 to engage the pin 3 at the outer edge of bed plate B. The die is then accurately positioned and secured in the press. In this swinging of plate 8 to horizontal position spring 7 is effective to bring the associated parts to the positions shown in Figs. I and II; block 82 elevated, and the plate 12 upwardly inclined from rear to front. Thus the die stands gaping open, ready to receive material.

When the material, ordinarily a sheet of metal has been thrust in, and rests upon die member D, and when in sequence thereafter ram C descends, the ram swings plate 12 upon its pivot 85 until the plate 12 comes to horizontal position. Then the ram C engaging plate 12 over an extended surface drives it downward in right-line travel. The spring 7 then has ceased to be effective to hold block 82 elevated (and in any case its tension is inconsiderable, in comparison with the powerful descent of ram C), and block 82 as the plate 12 descends is caused to move downward between its guides 81. The die members D and E perform their embossing function upon the material in relative movement which is a right-line movement, equal in distance throughout all the extent of the sheet area which is embossed, and the embossing strains are equal.

The inner one of the two blocks 81, and the reciprocating block 82, at the inner upper corners are advantageously beveled, as indicated at 86 and 87, and the inner and lower corners of the lugs 13 are beveled, as indicated at 80, to afford wide opening of the die with minimum but sufficient vertical play of block 82.

Figs. VI and VII will serve to suggest modifications. In Fig. VI the intermediate member takes the form of a stirrup 92. It is pivoted by its two terminal arms to the nether die plate 8, while provision is made for telescopic movement between this stirrup and the upper die plate 12. The upper die plate is in this instance formed with an offset depression within which stirrup 92 may move. It will be understood that the bottom web 93 of this offset portion of die plate 12 may be recessed for the passage through of the arms of stirrup 92.

In Fig. VII the intermediate member 72 is pivoted to the upper die plate 12, and in this respect the structure corresponds to that of Fig. II. This intermediate member, however, is stirrup shaped and the upper die plate 12 is pivoted to its upward extending arms. It moves telescopically on posts 71, rising from nether die plate 8.

We claim as our invention:

1. A three-part embossing die including upper and lower die plates and a bearing block, the bearing block being arranged between the die plates, leaving the outer faces of the die plane, and being pivoted to one die member and being telescopically connected to the other.

2. An embossing die including a nether die plate bearing integrally upon its upper face a block, a second block engaging the first block and movable telescopically with respect to the first block, and an upper die plate pivoted to the second block.

3. An embossing die including a nether die plate provided on its upper side with a guideway, a block movable vertically in such guideway, and an upper die plate pivoted to the said block.

4. An embossing die including a nether die plate carrying on its upper side and toward one end a pair of transversely arranged blocks forming a guideway, a block reciprocable vertically in such guideway, an upper die plate provided toward one end with a pair of lugs adapted when the parts are assembled to overlap the ends of the two blocks first named and to overlap the ends also of the block reciprocable vertically as aforesaid, said upper die plate being pivoted through the said lugs to the said vertically reciprocable block.

In testimony whereof we have hereunto set our hands.

WILLIAM R. ECKE.
JAMES H. MATTHEWS.